United States Patent
Light et al.

(10) Patent No.: US 7,693,796 B2
(45) Date of Patent: *Apr. 6, 2010

(54) METHOD AND APPARATUS FOR DATA RECIPIENT STORAGE AND RETRIEVAL OF DATA USING A NETWORK COMMUNICATION DEVICE

(75) Inventors: Elliott D. Light, Rockville, MD (US); James C.P. Lum, Oakton, VA (US)

(73) Assignees: Paypal, Inc., San Jose, CA (US); PayPal International Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/327,768

(22) Filed: Dec. 3, 2008

(65) Prior Publication Data
US 2009/0089182 A1 Apr. 2, 2009

Related U.S. Application Data

(63) Continuation of application No. 11/588,345, filed on Oct. 27, 2006, now Pat. No. 7,475,043, which is a continuation of application No. 09/552,088, filed on Apr. 19, 2000, now Pat. No. 7,146,341, which is a continuation-in-part of application No. 09/167,873, filed on Oct. 7, 1998, now Pat. No. 6,092,053.

(51) Int. Cl.
*G06F 17/60* (2006.01)
(52) U.S. Cl. .................................. 705/64; 705/1
(58) Field of Classification Search ................ 705/64, 705/1
See application file for complete search history.

(56) References Cited

U.S. PATENT DOCUMENTS 4,799,156 A 1/1989 Shavit et al.

(Continued)

FOREIGN PATENT DOCUMENTS

JP 2003323324 A 11/2003

(Continued)

OTHER PUBLICATIONS www.ecode.com.

(Continued)

*Primary Examiner*—Pierre E Elisca
(74) *Attorney, Agent, or Firm*—Kenyon & Kenyon LLP (57) ABSTRACT

A system and method for data recipient invoked electronic commerce allowing data subjects to provide information over a network and data recipients to receive such information relating to the needs of s data subject such as purchases, distribution of application information and the like. The system includes a server having software which gathers the information from a data subject to complete a transaction over a network. The system has a data subject data structure that stores information for registered data subjects. The software is able to access the data subject data structure and enter the data subject's information during subsequent transactions. Having the software obtain and enter the data subject's purchasing information, the data subject does not have to enter the same information every time the data subject desires to effect a transaction over the network. In alternate embodiments, the same technology can be applied to other arenas where a user may have to enter the same repetitive information.

8 Claims, 5 Drawing Sheets

U.S. PATENT DOCUMENTS

| | | | |
|---|---|---|---|
| 5,500,890 A * | 3/1996 | Rogge et al. | 379/91.02 |
| 5,715,314 A | 2/1998 | Payne et al. | |
| 5,724,424 A | 3/1998 | Gifford | |
| 5,890,140 A * | 3/1999 | Clark et al. | 705/35 |
| 5,960,411 A | 9/1999 | Hartman et al. | |
| 5,987,140 A | 11/1999 | Rowney et al. | |
| 6,058,378 A | 5/2000 | Clark et al. | |
| 6,092,053 A | 7/2000 | Boesch et al. | |
| 6,242,869 B1 | 6/2001 | Ohtsuka | |
| 7,146,341 B1 | 12/2006 | Light et al. | |
| 2001/0018672 A1 | 8/2001 | Petters et al. | |
| 2001/0037319 A1 * | 11/2001 | Edwards et al. | 705/80 |

FOREIGN PATENT DOCUMENTS

| | | | |
|---|---|---|---|
| JP | 2004188184 A * | 7/2004 | |
| JP | 2007026471 A | 2/2007 | |
| JP | 2008109422 A * | 5/2008 | |
| WO | 9703410 A1 | 1/1997 | |

OTHER PUBLICATIONS

McKenna, Patrick: Internet Money Is Blue Not Greet, pp. 1, Jun. 1997.

Bank Technology News, CyberCash Applies A Digital Makeover, pp. 1-2, Oct. 1998.

Moeller, Michael, ITM Takes Charge of E-Commerce, PC Week, pp. 1-2, Apr. 1996.

Freeman, Eva, How To Move E-Cash Around The Internet, pp. 1-2, Jun. 1997.

Derwent-Acc-No. 1996-335665; Fortenbery, M. et al.; Mar. 2001.

* cited by examiner

METHOD AND APPARATUS FOR DATA RECIPIENT STORAGE AND RETRIEVAL OF DATA USING A NETWORK COMMUNICATION DEVICE

This application is a continuation of application Ser. No. 11/588,345 filed Oct. 27, 2006, which is a continuation of application Ser. No. 09/552,088 filed Apr. 19, 2000, now U.S. Pat. No. 7,146,341, which is a continuation-in-part of application Ser. No. 09/167,873 filed Oct. 7, 1998, now U.S. Pat. No. 6,092,053. The contents of both of these patents are incorporated herein by reference.

FIELD OF THE INVENTION

This invention relates generally to a method and system where certain data subject information is stored on a server and is provided to a third party thereby allowing the data subject with a network communication device to send data over a network in an easy and safe manner.

BACKGROUND OF THE INVENTION

The essence of electronic commerce is the exchange of information. The most common form of electronic commerce entails the purchase of products over the Internet using a credit card. Information necessary to consummate a credit card transaction includes the data subjects name, address, credit card information, and the amount to be charge. While the term "electronic commerce" is generally associated with the purchase of goods and services over the Internet, the term encompasses other transactions as well. For example, applications for insurance, college admissions, and loans are transactions that are not purchase transactions. Hence the term "transaction" is generally used herein to describe all manner of interactions over a network of the type noted above. The common element to all transactions is the transfer of data from one party to another.

A person want to send personal data (the "data subject") can either type in the required information each time a transaction is consummated or store the data for retrieval. Typing in data is not only inefficient and prone to errors, but discourages electronic commerce. Using a local software solution is generally considered undesirable, as most such software programs are proprietary to a particular payment system, require the data subject to become skilled in the operation of the program, and are perceived as slow or unwieldy.

Recently, wireless Internet services have been developed to allow data subject use of wireless network communication devices such as wireless phones and PDAs (personal digital assistants) to send and receive information over the Internet. Wireless devices generally have limited memory making wallet software that is resident on a network communication device impractical. Even if wallet software for wireless devices could be written compactly, updating such software could prove very difficult. Many of these phones use proprietary software, so custom wallet software would need to be provided.

Similarly, cable television systems have evolved into two-way networks in which the data subject uses a network device to send and receive information over the cable network. The cable network communication device may be a set-top box or a remote unit. Like the wireless device, memory is limited and wallet software is impractical.

Therefore, a need exists for a system that allows a data subject to send data information to a data recipient over a common network in a manner that offers security, allows access from any network communication device that has access to the common network, and allows system upgrades without dependency on changing software on the data subjects' network communication device.

SUMMARY OF THE INVENTION

It is therefore an object of the present invention to reduce the number of steps a data subject is required to perform in order to send information with a network communication device over a common network.

A further object of the present invention is to reduce the number of steps a data subject is required to perform in order to purchase a product with a wireless device over a common network.

A further object of the present invention is to reduce the number of steps a data subject is required to perform in order to purchase a product with a wireless device over the Internet.

A further object of the present invention is to reduce the number of steps a data subject is required to perform in order to purchase a product over a network using a device that has reduced functionality, such as a wireless communication device or set top box connected to a cable network.

A further object of the present invention is to eliminate the need for data subjects to leave a data recipient's site to acquire an electronic form of payment.

A further object of the present invention is to eliminate wallet software and personal/identification information that is permanently stored on the data subject's NCD.

A further object of the present invention is to allow the system administrator of the data repository to upgrade the software on such server at any time.

A further object of the present invention is to allow flexibility in providing new or modified services to the data subjects via upgrades to software stored on the data repository.

A further object of the present invention is to reduce the number of payment parameters data subjects are required to fill in when purchasing products with a wireless device over a network.

A further object of the present invention is to allow data subject information to be provided to data recipients using payment systems from various service providers.

A further object of the present invention is to use the architecture of the data repository to aid the data subject with a wireless device in distributing all manner of information, not just purchase/money information, to a variety of recipients when those recipients are to receive essentially the same information from one recipient to the next.

A further object of the present invention is to provide a gateway communicating with the data repository using conventional network protocols and with the data subject NCD using network protocols appropriate to the network to which the NCD communicates.

The present invention is a system for presenting a data subject's purchasing information to a data recipient's computer to allow a sale of goods or services to be consummated. The system comprises a network communication device associated with a data subject (the "data subject's NCD"), a computer associated with a data recipient (the "data recipient's computer"), a gateway that connects the network to which the data subject's NCD communicates to the network on which the data repository and the data recipient's computer are connected (the "NCD gateway"), and a server (the "data repository" data repository) on which the necessary and desirable information about the data subject is stored. The data subject's NCD, the data recipient's computer, the NCD gateway, and the data repository are connected to a common network, such as the Internet, and communicate using communication protocols. The data subject's NCD operates software that can interpret and process files from the data recipient's computer and the data repository (the "NCD software"). The data recipient's computer operates as a web server, provides transaction processing, and performs other functions. The data recipient's computer may be a single device, or may, at the data recipient's discretion comprise a number of devices that may or may not be co-located. The data recipient's computer also operates software ("client software") that communicates with the data repository. The data repository operates data repository software that provides access to information stored in various databases, logs, and/or data structures.

The present invention allows data subjects with NCDs operating on a network (the "NCD network) to send transaction data over a network to which the data recipient computer and the data repository are connected (the "common network") and allows data recipients to receive data relating to that transaction. In the preferred embodiment, the transaction involves the purchase of goods and services, the common network connecting the NCD gateway, the merchant's computer, and the data repository is the Internet, and the transaction data is purchasing data. However, the invention is not limited to this embodiment and the description of a purchase transaction is not meant as a limitation.

During the shopping process, a data subject browses a data recipient's Web site via an NCD. The NCD may be any communications device connected to the common network via the NCD gateway. In this example, it is assumed that the NCD is a wireless device. The data recipient's Web site includes goods and/or services (herein, "item") for sale. The data recipient's Web site also operates client software. When the data subject requests a data recipient's offer, the client software sends a file readable by the NCD software and the data recipient's offer to the NCD software on the data subject's NCD. The data recipient's offer comprises in part a transaction number that is not representative of the product code or description. The NCD software readable file includes an address to the data recipient's Web page and instructions that instruct the NCD software to communicate with the data repository via a NCD gateway. The data recipient's offer passes through the data subject's NCD to the NCD gateway to the data repository software.

The data repository software returns a message to the NCD software via the NCD gateway and instructs the NCD software to display a wallet on the data subject's NCD. The content of this wallet depends on whether or not the data subject is known to the data repository software.

If the data subject is known to the data repository software, the data repository software takes information contained in the data recipient's offer and forwards it to the in a format that allows the NCD software to display the data recipient's offer and sends the data recipient's offer to the data subject's NCD where the data recipient's offer is displayed by the NCD software. The data subject is prompted to decide whether or not to purchase the item. Typically, this communication occurs by the data subject making a menu selection resulting in a message being communicated to the data repository via the NCD gateway.

If the data subject elects to purchase the item, the data repository software forwards information to the data recipient's computer. The information includes information from the data recipient's offer and the data subject's personal information (e.g., credit card number, address, shipping address) which is stored on the data repository. The data recipient's computer then uses the information to complete the transaction.

If the data subject is unknown to the NCD gateway and data repository software, the data repository software sends a request to the data subject's NCD via the NCD gateway. The request prompts the data subject to provide the purchasing information to complete the transaction. Once the data subject provides sufficient information via the NCD gateway to complete the transaction, the data repository software prompts the data subject via the NCD gateway to purchase the item as noted above. If the data subject elects to purchase the item, then the data subject is prompted to elect to have the information retained on the data repository for future use (the process herein referred to as "registration"). If the data subject answers "no", then the information is stored in a temporary data structure. Information stored in the temporary data structure is retained for a set amount of time and is not available for reuse by the data subject. If the data subject answers "yes", then the information pertaining to the data subject is stored in a data structure intended for the retention and future use by the data subject.

If the data subject elects to register with the data repository software, during the registration process, the NCD software is sent a NCD software identifier. In the preferred embodiment, the NCD software identifier is a cookie. The NCD software identifier contains data that are crypto graphically protected to enhance security. The NCD software identifier allows the data repository software to identify the NCD software and permits a customer to authenticate himself or herself, thereby permitting the data repository software to use the data subject's stored information in future transactions.

The system also allows data subjects who are registered on a different browser to authorize the data repository software to use the data subject's stored information. This situation occurs when the data repository software cannot identify the NCD software identifier because there is no NCD software identifier in the NCD software or the NCD software identifier cannot be used to identify the particular data subject using the NCD software.

Since the system establishes communication links between the data recipient's computer and the data repository, the system can be optimized in several respects. For example, the price of an item may be affected by the location to which the item is to be shipped, the method of shipping, and by tax obligations. The data repository software communicates information pertaining to the data subject to the data recipient's computer permitting the data recipient's computer to determine a "final" price based on the data subject's information, i.e., shipping address and/or preferences.

The data repository software can associate a data subject with an identification code that can be presented to the data recipient's computer, thus allowing the data recipient to "recognize" a data subject and provide customer-specific messages, displays, and offers. The data repository software and/or NCD gateway can tailor its communication with the data subject's NCD in accordance with a profile created by the data repository software or NCD gateway. The profile is based upon preferences chosen by the data subject or created by the data repository software or NCD gateway based on the data subject's behavior, from preferences chosen by the data recipient, the wireless device type, or the like.

With respect to data subjects, the system is optimized to provide all of the purchasing information to the data subject thereby allowing the data subject to verify the information and make a purchase decision without further purchasing information input from the data subject. The system can also establish a dialogue via the NCD gateway between the data subject's NCD and the data repository to permit the data subject to select from options such as which credit card to use, the shipping address, and the shipping means.

In the preferred embodiment, the data subject's NCD is a wireless device and the NCD gateway operates a version of the wireless application protocol ("WAP"). However, the NCD may be any device that may access the common network through a gateway and send and receive files in a language that is common to the data subject's computer and the data recipient's computer. For example, the NCD may be a set-top box used by a data subject to interact with a cable television system that connects to the Internet through a NCD gateway.

DETAILED DESCRIPTION OF PREFERRED EMBODIMENT

Figure 1:
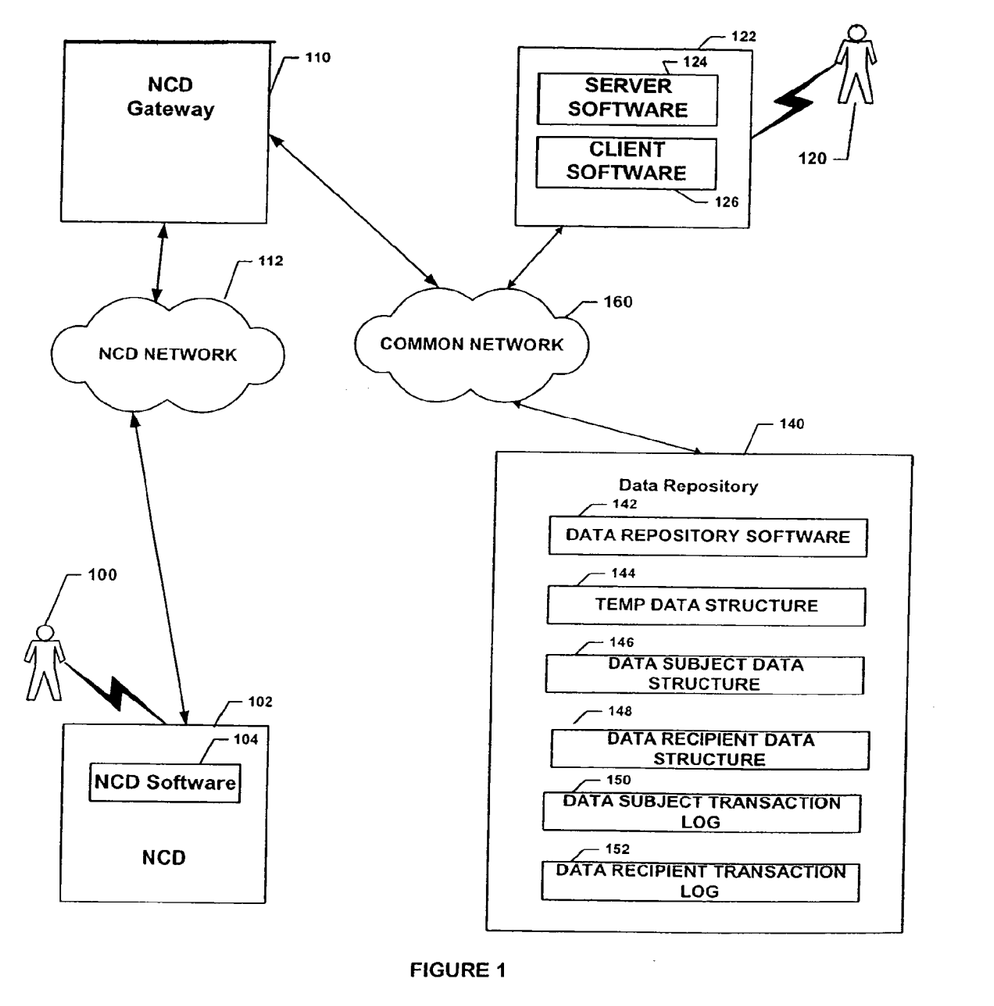
FIG. 1 illustrates a wireless network connected to the Internet through a WAP-enabled gateway.

Referring to FIG. 1, the elements of the present invention are illustrated. The preferred embodiment for this function is assisted by the technology disclosed in U.S. Pat. No. 5,327,529, which issued on Jul. 5, 1994, and is incorporated herein by reference. A portion of the technology described in the '529 patent, which is referred to as the "Flex UI Patent," has been realized by Geoworks of Alameda, Calif., in the implementation of the Wireless Application Protocol (WAP) and the corresponding Wireless Markup Language (WML). WAP was promulgated to allow application programs to be written to operate on a wide array of wireless communications networks. With WAP and the WML, an application can be written once, and it will operate on any WML-compliant device operating on a WAP-compliant wireless communications network.

The present invention allows data subject 100 to purchase a product or service (hereinafter an "item") over common network 160 and allows data recipient 104 to receive payment information relating to the transaction.

To purchase an item, data subject 100 uses data subject's NCD 102. Data subject's NCD 102 operates software that is either a web browser or emulates a web browser (the "NCD software") 104 or could also be software with the requisite capability of displaying the information supplied by data recipient computer 122. NCD software 104 allows data subject 100 to download and display Web pages.

To receive payment information relating to the purchase, data recipient 120 uses data recipient computer 122. Data recipient computer 122 operates network server software 124 and client software 126. Network server software 124 displays a data recipient's Web pages. Client software 126 allows data recipient 104 to communicate with the Data repository (the "data repository") 140.

In the preferred embodiment, data repository 140 comprises data repository software 142 which gathers and stores the purchasing information to complete a purchasing transaction over common network 160, temporary data structure 144 which stores data subject information for a limited amount of time and cannot be used in future transactions, data subject data structure 146 which stores data subject information which can be used in future transactions, data recipient data structure 148 which stores information pertaining to different data recipients, data subject transaction log 150 which stores information pertaining to the transactions for registered data subjects, and data recipient transaction log 152 which stores information pertaining to transactions for registered and non-registered data subjects.

Data subject's NCD 102 is connected to NCD gateway 110 over NCD network NCD gateway 110 incorporates software and hardware to permit the data subject's NCD to display and implement instructions included in the files sent by data recipient computer 122. The present invention can operate over various types of NCD networks both wired and wireless and satellite, however this should not be construed as a limitation. In the preferred embodiment, data subject's NCD 102 is a wireless device, NCD gateway 110 operates a WAP interface, NCD network 112 is a wireless network, and the computer files sent and by data subject's NCD 102, data recipient computer 122, and data repository 140 are written in HTML.

NCD gateway 110, data recipient computer 122, and data repository 140 are connected to common network 160. The present invention can operate over various types of common networks both wired and wireless. The present invention can operate over the Internet, cable, intranet, LANS, and WANS however this list should not be construed as a limitation. In the preferred embodiment, the common network is the Internet.

Data repository software 142 gathers and stores the purchasing information to complete a transaction over common network 160. Data repository software 142 gathers the transaction information directly from data subject 100, from data subject data structure 146 or from both. If data subject 100 has not previously registered with data repository software 142, data subject 100 is treated as a non-registered data subject. For non-registered data subjects, data repository software 142 gathers the transaction information by prompting data subject 100 for the information. If data subject 100 is a registered data subject, i.e., a data subject who previously registered with data repository software 142, then data repository software 142 gathers the transaction information from data subject data structure 146. If additional transaction information is needed, data repository software 142 prompts data subject 100 for the information.

Temporary data structure 144 stores label-value pairs relating to a particular interaction between data subject 100 and data recipient 120. If data subject 100 is not known to data repository software 142 (discussed below), data subject 100 is prompted for transaction information to complete the transaction. The transaction information can include the customer's name, billing address, shipping address, and credit card number, however this information should not be construed as a limitation. In the preferred embodiment, the transaction information is stored in temporary data structure 144 that is located at data repository 140. In alternative embodiments, the transaction information can be stored on a dedicated server or a shared server.

If data subject 100 declines to have transaction information stored at data repository 140, the transaction information remains in temporary data structure 144 for a set period of time. The transaction information in temporary data structure 144 is not available to data subject 100 for future transactions. If data subject 100 elects to have transaction information stored at data repository 140, the transaction information in temporary data structure 144 will be saved for subsequent use in data subject data structure 146.

Data subject data structure 146 stores label-value pairs relating to data subjects, including data subject 100, that have completed the registration process with the operator of data repository 140. The label-value pairs in data subject data structure 146 represent information that is necessary, and may include information that is useful to complete a transaction. The transaction information can include the customer's name, billing address, shipping address, and credit card number, however this information should not be construed as a limitation. The useful information can also include email, telephone numbers, facsimile numbers, and user preference data (regarding shipping address, shipping method, and related data), however this information should not be construed as a limitation.

Data recipient data structure 148 stores label-value pairs relating to data recipients, including data recipient 120 that have completed the registration process with the operator of data repository 140. The label-value pairs in data recipient data structure 148 represent information that is necessary to identify data recipient 120 and data recipient computer 122. This information includes contact information, data recipient identification number, network location(s) for the data recipient computer 122, payment card type, accepted currencies, and payment methods (e.g., electronic check, micropayments), however this information should not be construed as a limitation.

Data subject transaction log 150 stores label-value pairs relating to transactions performed by registered data subjects. Data recipient transaction log 152 stores label-value pairs relating to transactions performed by registered and non-registered data subjects, including data subject 100. The operator of data repository software 142 can allow data subjects and data recipients access to the information contained in their respective data structures as deemed necessary. For instance, data subject 100 can be given a summary of the data subject's transactions over a period of time. Data recipient 120 can be given a summary of the data recipient's transactions over a period of time.

U.S. patent application Ser. No. 09/167,873, filed Oct. 7, 1998 discloses the underlying wallet process and system of the present invention, and is incorporated here in its entirety. Data recipients invoke commerce by sending an offer to a wallet server via the data subject. The wallet server supplies the information needed by the data recipient to complete the transaction.

In the preferred embodiment of the present invention illustrated herein the data subject's NCD is a wireless device that communicates over a wireless network to a WAP-enabled gateway. It should be noted that while a WAP-enabled gateway is discussed, this is not meant as a limitation since WAP is but one protocol for making two different networks "talk" to one another. The concept may be similarly employed to, for example, a cable network to communicate with the internet, in which case a WAP enabled gateway is not required. The data subject's NCD, the data recipient server, and the data repository all send files in a common language. This language may be, without limitation, HTML, WML, XML, or other language. The preferred embodiment uses HTTP to send the offer to the NCD software. The NCD software forwards the HTML and/or WML message to a WAP-compliant NCD gateway for forwarding to the data repository. Further communication between the devices, as described earlier, is accomplished with the aforementioned protocols to complete the transaction.

In another embodiment of the present invention, the WAP gateway does not merely forward information but itself stores information relevant consumers who are connected to the wireless network. In this case, interaction can take place between the merchant and the gateway for certain selected communications such as authentication without the need for the consumer to be involved. This data can be stored at the gateway and used for such limited purposes.

In another alternate embodiment, the NCD software concerts the files sent by the data recipient's computer and the data repository into a language that the NCD can interpret. The NCD software also converts files created by the NCD software into a language that the data recipient's computer and the data repository can interpret.

Figure 2A:
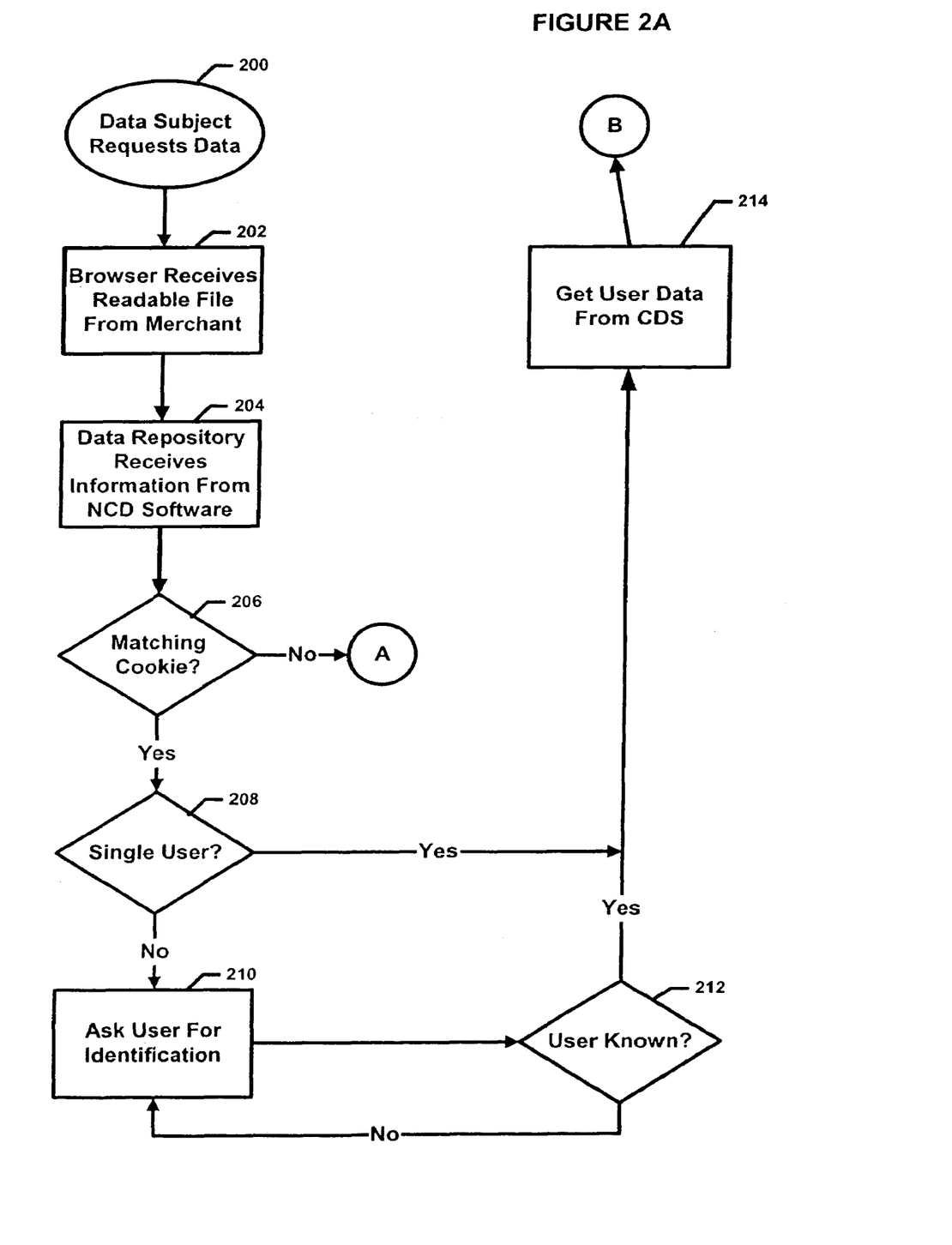
FIG. 2A Illustrates the process of purchasing an item over a network

Referring to FIG. 2A, the process of purchasing an item over a network is illustrated. The following process is the preferred embodiment of the present invention, in alternate embodiments, similar processes can occur in different orders. Additionally, a transaction involving the exchange of information may involve the storage and retrieval of data different from that described in the following example.

In the preferred embodiment, the process starts with a data subject requesting a data recipient's offer 200 from a data recipient. In response to the data subject's request, the data recipient's computer responds by sending a NCD software readable file and the data recipient's offer to the data subject's computer 202. The NCD software processes the NCD software readable file and sends the data recipient's offer and a message to the data repository 204.

The data recipient's offer includes the following information, however this information should not be considered a limitation: data recipient identifier, price of the item, a form of digital signature of the data recipient, a final price indicator, and a transaction number. The data recipient identifier identifies the data recipient who is offering the item for sale. The price of the item is cost to purchase the item. A digital signature of the data recipient is used to ensure the validity of the offer. The final price indicator is used to indicate whether the final cost for the item is affected by the data subject's shipping address and/or shipping preference. The transaction number is used for tracking purposes. The transaction number does not contain any product identifying information. The transaction number acts as an identifier for identifying a transaction.

The message sent from the NCD software to the data repository indicates whether the NCD software contains an NCD software identifier. In the preferred embodiment, the NCD software identifier is a cookie. A NCD software identifier identifies the data subject browser on a specific data subject's NCD. The data repository software receives and processes the message to determine if the NCD software contains an identifier that identifies a data subject that matches a data entry in a file in the data subject data structure of the data repository 206. The data repository software determines whether a single user or multiple users have used the NCD software 208 by checking the data subject data structure. If the data repository software identifies more than one user, the data repository software will select a user based on a selection criteria generated by the operator of the data repository. If the user selected by the data repository software is not the current user and the current user objects, then the data subject is asked for identification 210. If the current user does not object, as described below, the current user cannot complete a transaction unless the current user enters the proper passphrase which belongs to the selected user. This process requires the data repository software to send a message to the data subject's computer prompting the data subject to provide information to identify the data subject. In the preferred embodiment, the data repository software prompts the data subject for the data subject's identification number, email address, and a passphrase. The data subject's identification number, email address, and passphrase are used to authenticate the data subject. These entries were provided by the data subject during the registration process which is discussed below. In alternate embodiments, the data subject can be prompted for different information to identify the data subject.

The data subject's response is sent back to the data repository where the data repository software then determines if the data subject is known to the data repository software 212. A known or registered data subject is a data subject has previously registered with the data repository software and whose information matches information supplied by the data subject during a prior registration. If the data repository software determines that the information provided by the data subject is insufficient to identify the data subject, then the data repository software prompts the data subject for the same information again. The operator of the data repository can set the number of iterations that the data subject is prompted for the data subject's identity. If the data subject's response matches the information the data subject supplied during registration, then the data repository software accesses and gathers the data subject's information which is stored in the data subject data structure (CDS) 214.

In an alternative embodiment, the system can include a plurality of data repositories. In such a system, the data subject would be registered on one of the data repositories. If the data repository software determines that the information provided by the data subject does not match the information on the data repository the data subject is connected to, then the data repository software will communicate with the other data repositories to identify the data subject and obtain the data subject's information.

If the NCD software does not contain a NCD software identifier or if the information the data subject provided does not properly identify the data subject, i.e., the data subject is not found in a file in the data subject data structure of the data repository, the data repository software prompts the data subject for the purchasing information 216. This is accomplished by the data repository software sending a form to the NCD software. In an alternative embodiment, the data subject is prompted for the purchasing information using a plurality of forms. The form or forms prompts the data subject to provide the purchasing information to complete the transaction. The purchasing information includes the data subject's name, address, shipping address, and credit card number, however this list should not be construed as a limitation. In the preferred embodiment, the data subject has the option of indicating that the data subject is a registered data subject.

The data subject's response or responses are sent to the data repository 218. The data repository software then determines if the data subject claims to be a registered data subject 220. If the data subject claims to be a registered data subject, then the data repository software prompts the data subject for proof 222. In the preferred embodiment, this is accomplished by the data repository software prompting the data subject for the data subject's identification number, email address, and a passphrase. The data subject's identification number, email address, and passphrase are used to authenticate the data subject. These entries were provided by the data subject during the registration process which is discussed below. In alternate embodiments, the data subject can be prompted for different information to identify the data subject.

The data subject's response for proof is sent back to the data repository where the data repository software then determines if the data subject is a registered data subject 224. Again, a registered data subject is a data subject that has previously registered with the data repository software and whose information supplied by the data subject matches information supplied by the data subject during a prior registration.

If the data repository software determines that the information provided by the data subject matches the information the data subject supplied during registration, then the data repository software accesses and gathers the data subject's information which is stored in the data subject data structure (CDS) 214.

Figure 2B:
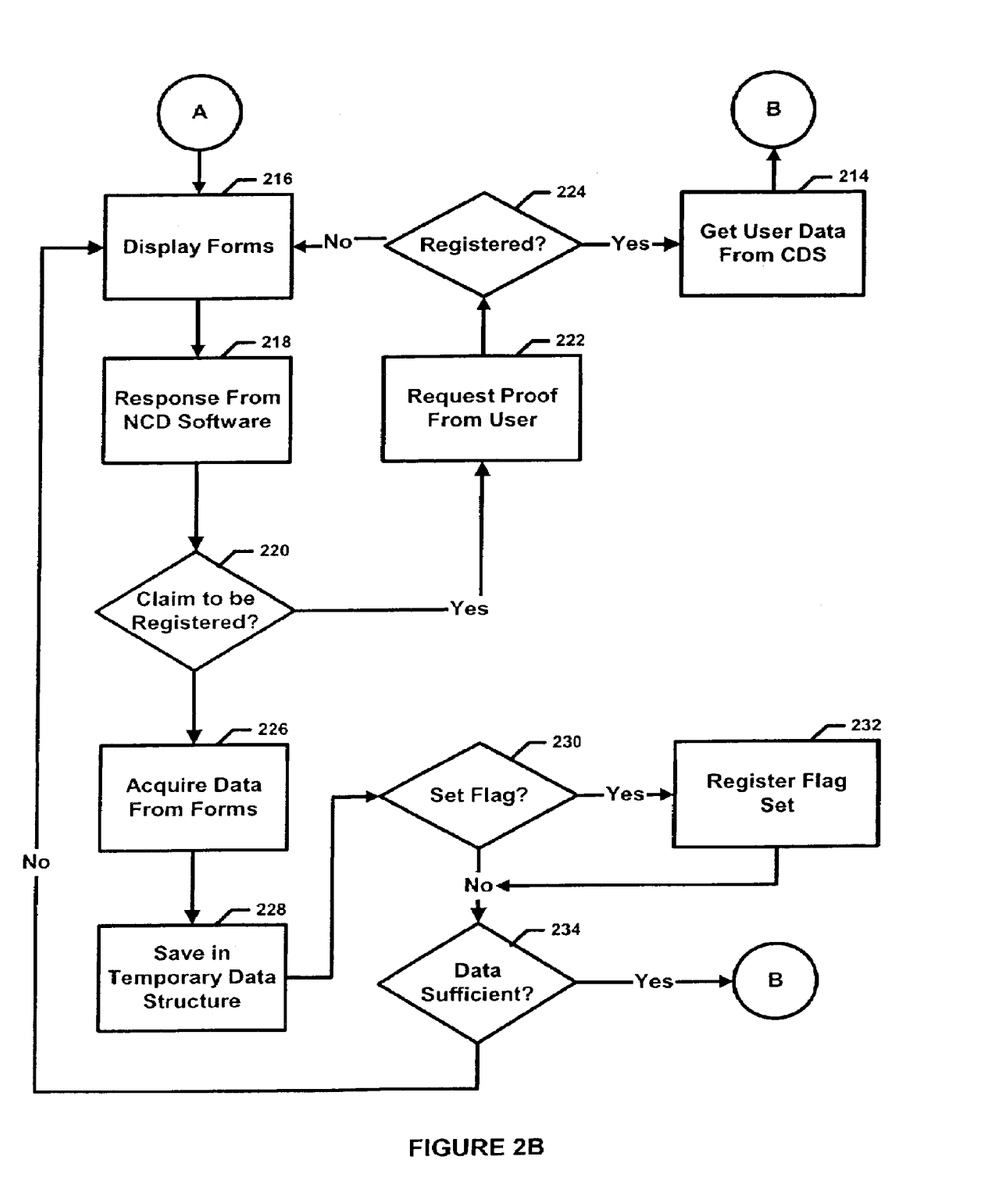
FIG. 2B illustrates the actions of the data repository software if it determines that the information provided by the data subject is insufficient to identify the data subject.

Referring to FIG. 2B, if the data repository software determines that the information provided by the data subject is insufficient to identify the data subject, then the data repository software prompts the data subject for the purchasing information to complete the transaction 216.

If the data subject does not claim to be registered then the data repository software acquires the data subject's data from the forms 226. In addition, the data subject's response can be sent to the data recipient to determine whether the item can be sold to that data subject. For instance, a data subject in one state may not be able to purchase a firearm if the law governing the data subject or data recipient does not permit such a transaction. In yet another embodiment, the data subject response to one question can lead to another question which requires another form. For instance, if the data subject requests overnight shipping, the data repository software can prompt the data subject to select the overnight shipping service.

The data repository software stores the data in a temporary data structure 228. The data is evaluated to determine if the data subject elected to register with the data repository 230. If the data subject elects to become a registered data subject, then the data repository software sets the flag 232. If the data subject does not elect to become a registered data subject then the flag is not set. Registration allows the data repository software to access the data subject's information which was previously stored in the data subject data structure. The information acquired from the forms is evaluated to determine if the information from the data subject is sufficient to complete the purchase transaction 234. This step includes the data repository software accessing the data recipient data structure using the data recipient identifier to ensure that the data subject's purchasing information is in proper order, i.e., to check that the data subject's credit card accepted by the data recipient. If the information is not sufficient, the data subject is prompted for the information again 216. The operator of the data repository can set the number of iterations that the data subject is prompted for the information.

Figure 2C:
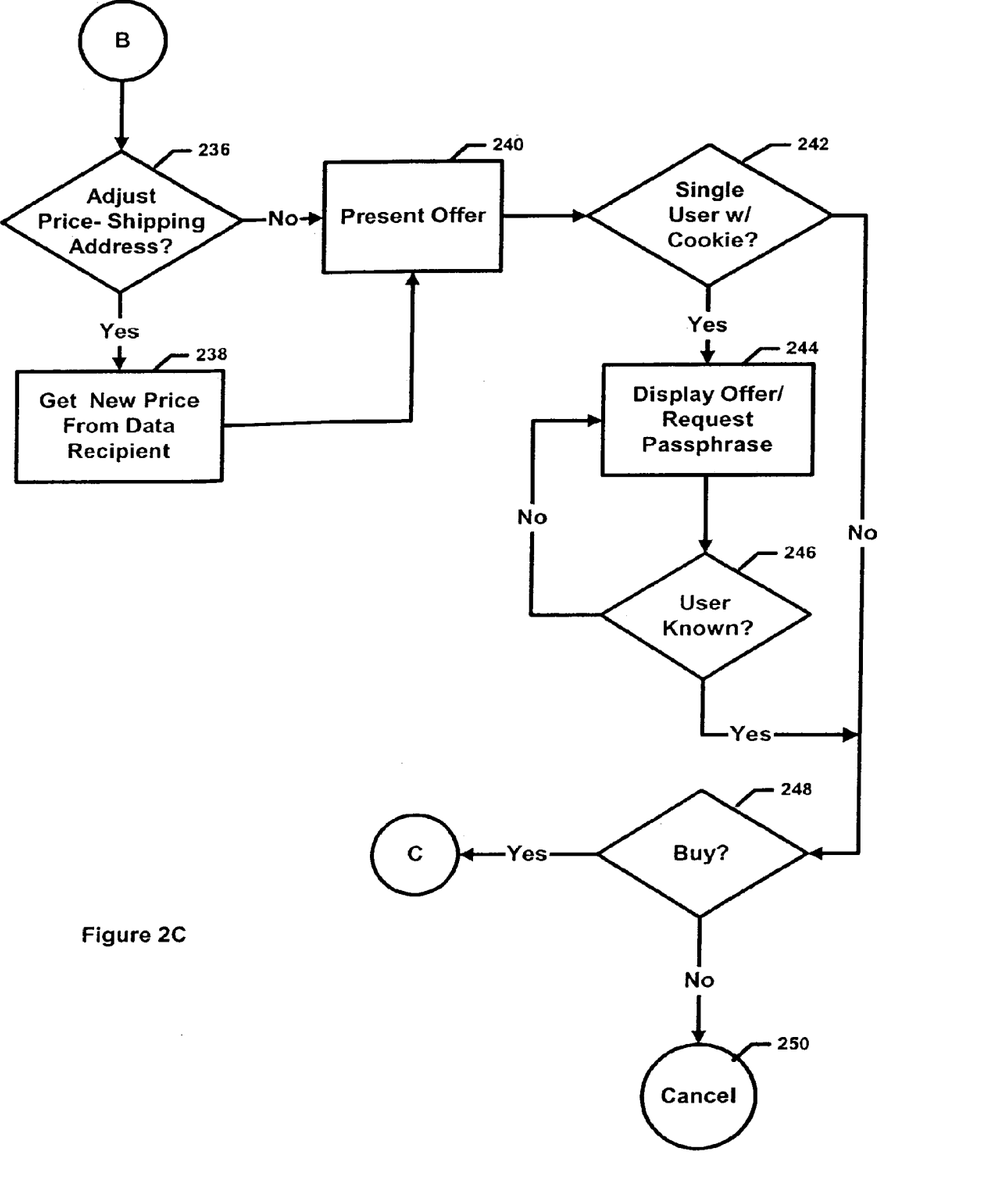
FIG. 2C illustrates the actions of the data repository if the item price needs to be adjusted due to the data subject's shipping address and/or shipping preference.

Referring to FIG. 2C, once the data repository software determines that the data subject's information is sufficient to complete the purchase transaction, the data repository software reads the final price indicator in the data recipient's offer to determine if the price needs to be adjusted due to the data subject's shipping address and/or shipping preference 236. If the price is affected by the data subject's shipping address and/or shipping preference, then the data repository software communicates the required information to the data recipient to calculate a new price based on the data subject's shipping address 238. In the preferred embodiment, the data repository software only sends the city, state, country, and mail code information to the data recipient's computer. This information is limited to permit the revised price calculation without having to disclose personal information relating to the data subject.

In alternate embodiments, the data subject's address can be the data subject's email address or a facsimile number.

Once the data recipient responds with the revised price or if the price was not affected, the data repository software presents the data recipient's offer to the data subject 240. The data recipient's offer is displayed to the data subject in the area reserved for the wallet. The data repository software then determines if the data subject needs to enter a passphrase. If the data subject is a registered data subject has not gone through the authentication process yet, then the data subject is required to enter the proper passphrase for the data subject identified with the NCD software identifier (cookie) 242. The offer is then augmented with a prompt for the user to enter the data subject's passphrase 244. The data repository software evaluates the entered passphrase against data held in the data subject data structure 246 to determine if the data subject is known (registered) by the data repository software. If the passphrase does not match, then the data subject is prompted for the correct passphrase 244. The operator of the data repository can set the number of iterations that the data subject is prompted for a correct passphrase to avoid multiple fraudulent attempts to access information.

Once the data subject enters a correct passphrase or if there was no NCD software identifier for the data subject, the data subject is presented with a buy decision The data subject has several options available at this step: the data subject can elect to buy the item, change the data subject's information and buy the item, or cancel the transaction. If the data subject elects to change the data subject's information, the data subject must still decide to either buy the item or cancel the transaction after changing the information. If the data subject declines to purchase the item, then the transaction is canceled, then the information held in the temporary data structure is deleted, the dialogue ends and the transaction is terminated 250.

The data subject also has the option of changing the data subject's information. The data subject may wish to change such information for such reasons as the data subject does not agree with the selection by the data repository software or the information contains an error. For instance, if the data subject wishes to change the shipping address, the data subject can enter a new shipping address. In some instances, the data subject can have a plurality of possible entries into the same information block with a preferred entry. In such a situation, the data repository software chooses the preferred information to enter into the information block. The data repository software chooses the information via any selection process known in the art, such as most popular, last used, first used, etc. However, the data repository software cannot enter information into an information block if the data recipient will not allow such an entry. For instance, a data recipient may only accept the ACME credit card and the data subject has not previously used an ACME credit card to purchase an item using the present invention. In such a situation the data repository software prompts the data subject to provide an acceptable form of payment. Information options are available to the data subject in the form of directory of addresses, shippers, shipping methods, credit cards, and other information options.

Figure 2D:
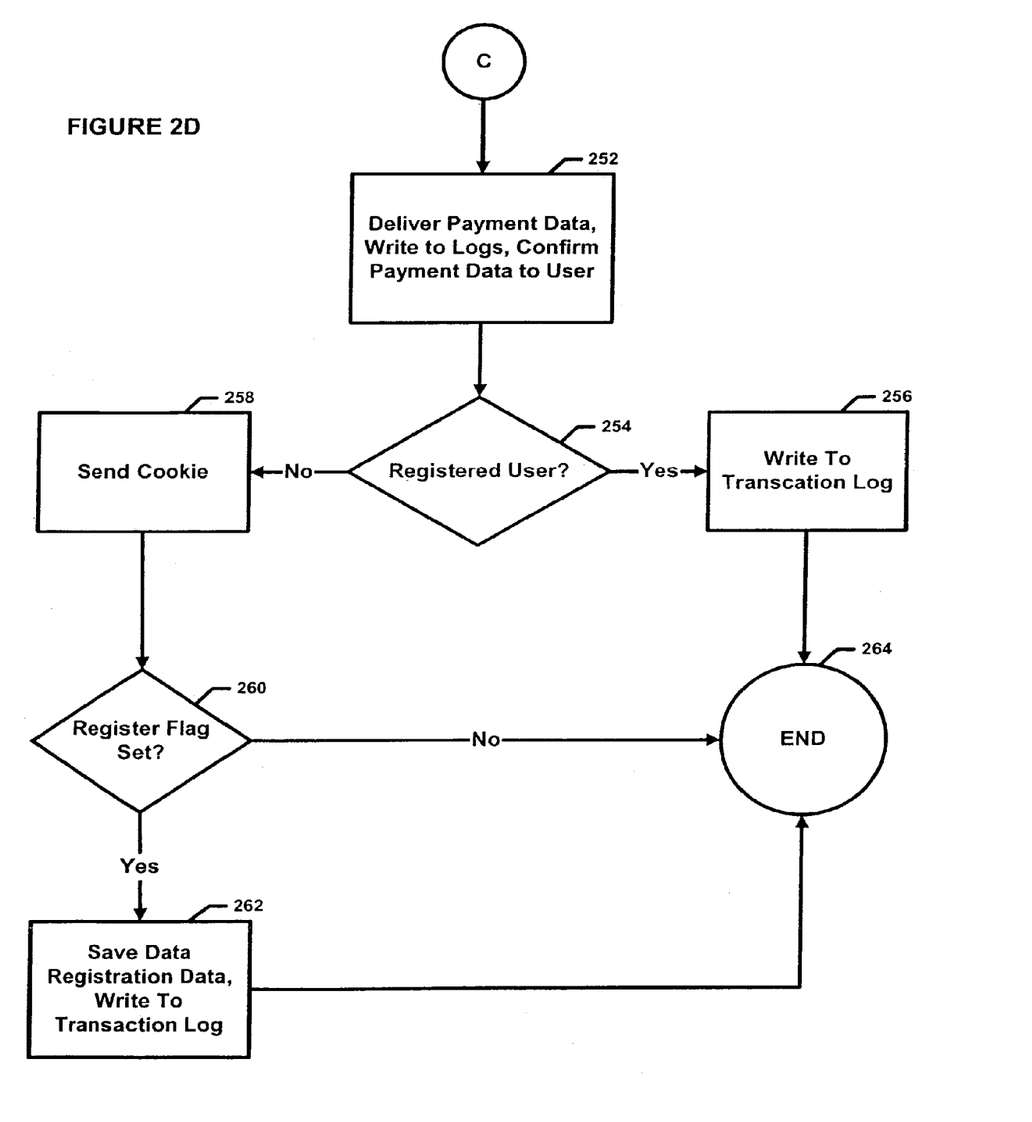
FIG. 2D illustrates the actions of the system of the present invention if the data subject elects to purchase an item.

Referring to FIG. 2D, if the data subject elects to purchase the item, then the information regarding the transaction is delivered to the data recipient's computer, information is written to the data recipient transaction log, and a message confirming the transaction is sent to the data subject's computer 252. The data repository software then determines if the data subject is registered 254. If the data subject is a registered data subject, then the information regarding the transaction is written to the data subject transaction log 256.

If the data subject is non-registered data subject, i.e., not known to the data repository software, then a NCD software identifier (i.e., a cookie) is sent to data subject's computer 258 and data repository software determines if the register flag was set 260. If the register flag is set, then the information stored in the temporary data structure pertaining to the data subject is transferred to the data subject data structure for subsequent uses, the data subject is prompted for a passphrase, and the data repository software saves the transaction data to the data subject transaction log 262. If the register flag is not set, the transaction data remains in the temporary data structure until it is discarded but is unavailable for future use. The transaction process ends 264.

In addition to registering during a purchasing transaction, a data subject can also register by accessing the data repository and entering the purchasing information to become a registered data subject in advance of any purchase.

Although the above description is directed at purchasing an item over the Internet, the same concept of distribution of information can be applied to other areas. In an alternative embodiment, the data subject can be an accessee, the data recipient can be an accessor, the data subject data structure can be an accessee data structure, the data recipient data structure can be an accessor data structure, the data subject transaction log can be an accessee transaction log, and the data recipient transaction log can be an accessor transaction log. The accessee can authorize the software on the data repository to provide information to an accessor. For instance, the accessee can be a prospective applicant applying for admission into an educational institution such as a college or a university. In this case, the prospective applicant stores an entire range of information on the data repository where the information is relevant to the initial screening for college applications. For example, SAT scores, addresses for references, personal information, responses to questions of desired major or subject area would be information stored on the data repository. This information could then be supplied to colleges whose Web sites could access the data repository for the desired information.

In yet another embodiment, the entity desiring to allow access to its information can be a potential mortgage borrower, the entity desiring access can be a mortgage lender, and the information stored on the data repository can be the borrower's financial information. In the example, the borrower can authorize the software on the data repository to provide the mortgage lender the information stored on the data repository to allow the borrower to apply for a mortgage or to get a quote. Again, the borrower would provide a wide range of data necessary for the mortgage application process. The information can include the borrower's credit reports, bank statements, employment record, and other credit related information.

In all of these different type of embodiments, the communications between the different parties can be encrypted in any manner known in the art. In addition, some of the communications can be accomplished in different manners. For example, in an alternate embodiment of the preferred embodiment, communications between the data repository and the data recipient computer can occur using a separate communication link. The communication link can be a direct link between the data recipient and the data repository. Using this separate link can ensure against unauthorized transactions.

Although the present invention has assumed the need for a gateway connecting the NCD network to the common network, the same concepts described herein apply to NCDs that do not require a gateway to connect to the common network.

Although the present invention has been described in detail for purpose of illustration, it is understood that such detail is solely for that purpose, and variations can be made therein by those skilled in the art without departing from the scope of the invention. The preceding descriptions of the operations of the present invention are merely illustrative. In various embodiments of the disclosed inventions operational steps may be added, eliminated, performed in parallel or performed in a differing order. The apparatus and process of the present invention is defined by the following claims.

What is claimed is:

1. A data repository, connected to a first network for purchasing an item from a data subject network communications device, said communications device being connected to a second network, the first and second networks communicably connected to each other, the data repository comprising a server for:

receiving an offer and a message from the data subject network communications device;

in response to the offer, determining an identity of a data subject based on the message;

gathering stored payment data associated with the data subject based on the determined identity;

presenting the offer to the data subject network communications device;

receiving a purchase decision from the data subject network communications device; and sending the payment data to a data recipient computer, wherein the data repository stores the payment data and associates the payment data with the data subject, and wherein the offer and the message are received at the data repository in response to the offer and a data file sent from the data recipient computer to the data subject network communications device.

2. The data repository of claim 1, the server further:

prompting the data subject for identification;

receiving identifying information from the data subject network communication device; and authenticating the data subject based on the identifying information.

3. The data repository of claim 2, wherein the identifying information includes an identification number, an email address and a passphrase.

4. The data repository of claim 2, the server further:

prompting the data subject for purchasing information; and receiving the purchasing information from the data subject network communication device.

5. The data repository of claim 1, wherein the offer includes a data recipient identifier, a price, a data recipient digital signature, and a transaction number.

6. The data repository of claim 5, the server further:

determining whether to adjust the price based on a data subject address; sending the price and the data subject address to the data recipient computer; and receiving a revised price from the data recipient computer.

7. The data repository of claim 1, wherein the message includes a network communication device software identifier.

8. The data repository of claim 7, wherein the message is a cookie.

* * * * *